US011211673B2

(12) United States Patent
Shimizu et al.

(10) Patent No.: US 11,211,673 B2
(45) Date of Patent: Dec. 28, 2021

(54) WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hiroshi Shimizu, Mie (JP); Hitoshi Takeda, Mie (JP); Ryouya Okamoto, Mie (JP); Tomoki Idota, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 447 days.

(21) Appl. No.: 16/318,942

(22) PCT Filed: Jul. 6, 2017

(86) PCT No.: PCT/JP2017/024780
§ 371 (c)(1),
(2) Date: Jan. 18, 2019

(87) PCT Pub. No.: WO2018/016334
PCT Pub. Date: Jan. 25, 2018

(65) Prior Publication Data
US 2019/0198847 A1 Jun. 27, 2019

(30) Foreign Application Priority Data
Jul. 22, 2016 (JP) .............................. JP2016-144767

(51) Int. Cl.
*H01M 50/502* (2021.01)
*H01G 4/228* (2006.01)
(Continued)

(52) U.S. Cl.
CPC ........... *H01M 50/502* (2021.01); *B60R 16/04* (2013.01); *H01B 5/02* (2013.01); *H01B 17/00* (2013.01);
(Continued)

(58) Field of Classification Search
CPC ......... H01R 11/28; H01R 11/12; H01M 2/206
(Continued)

(56) References Cited

U.S. PATENT DOCUMENTS 5,187,027 A * 2/1993 Larkin .................. H01M 50/20
429/99
6,036,554 A * 3/2000 Koeda .................... H01R 4/305
439/796
(Continued)

FOREIGN PATENT DOCUMENTS

JP 2013-097962 5/2013
JP 2013-105584 5/2013
(Continued)

OTHER PUBLICATIONS

Official Communication issued in International Bureau of WIPO Patent Application No. PCT/JP2017/024780, dated Sep. 5, 2017.

*Primary Examiner* — William H. Mayo, III
*Assistant Examiner* — Krystal Robinson
(74) *Attorney, Agent, or Firm* — Greenblum & Bernstein, P.L.C.

(57) ABSTRACT

An insulating protector attached to one side of a unit cell group includes: two bus bar housing portions, in each of which a plurality of bus bars for connecting adjacent electrode terminals are aligned and housed, and are respectively
(Continued)

provided at positions near two lateral side edge portions of the insulating protector extending in a direction in which the bus bars are aligned; and two wire routing grooves that are provided on an inner side of each bus bar housing portion, and in which detection wires drawn from unit cells are routed so as to detect the state of the unit cells. A bus bar cover for covering the closer one of the bus bar housing portions and a wire cover for covering the wire routing groove on the inner side of the closer bus bar housing portion are provided on each lateral side edge portion of the insulating protector.

3 Claims, 12 Drawing Sheets

(51) Int. Cl.
| | |
|---|---|
| *H01G 2/04* | (2006.01) |
| *H01G 2/10* | (2006.01) |
| *H01M 50/20* | (2021.01) |
| *H01B 5/02* | (2006.01) |
| *H01B 17/00* | (2006.01) |
| *H01M 50/298* | (2021.01) |
| *H01M 50/296* | (2021.01) |
| *B60R 16/04* | (2006.01) |
| *H01B 17/56* | (2006.01) |

(52) U.S. Cl.
CPC ............... *H01G 2/04* (2013.01); *H01G 2/10* (2013.01); *H01G 4/228* (2013.01); *H01M 50/20* (2021.01); *H01M 50/296* (2021.01); *H01M 50/298* (2021.01); *H01B 17/56* (2013.01); *H01M 2220/20* (2013.01)

(58) Field of Classification Search
USPC .......................................................... 429/158
See application file for complete search history.

(56) References Cited

U.S. PATENT DOCUMENTS

| | | | | |
|---|---|---|---|---|
| 6,261,719 | B1* | 7/2001 | Ikeda | H01M 50/502 |
| | | | | 429/211 |
| 8,859,134 | B2* | 10/2014 | Ikeda | H01M 50/502 |
| | | | | 429/158 |
| 9,209,550 | B2* | 12/2015 | Kinoshita | H01M 50/553 |
| 9,425,520 | B2* | 8/2016 | Kinoshita | H01M 10/48 |
| 10,249,966 | B2* | 4/2019 | Yaita | H01R 13/465 |
| 10,886,519 | B2* | 1/2021 | Sato | H01M 10/482 |
| 10,937,565 | B2* | 3/2021 | Fujioka | H01R 4/72 |
| 10,957,891 | B2* | 3/2021 | Hirano | H01M 50/502 |
| 10,957,895 | B2* | 3/2021 | Yanagida | H01M 50/528 |
| 10,964,989 | B2* | 3/2021 | Yanagida | H01M 50/20 |
| 2014/0256178 | A1* | 9/2014 | Kinoshita | H01R 13/60 |
| | | | | 439/529 |
| 2014/0311768 | A1 | 10/2014 | Takishita et al. | |
| 2018/0198110 | A1* | 7/2018 | Zeng | H05K 1/0293 |

FOREIGN PATENT DOCUMENTS

| | | |
|---|---|---|
| JP | 2013-178969 | 9/2013 |
| JP | 2016-009646 | 1/2016 |

* cited by examiner

WIRING MODULE

TECHNICAL FIELD

A technique disclosed in the specification of the present application relates to a wiring module.

BACKGROUND ART

In electric vehicles, hybrid vehicles or the like, a battery module is mounted that includes a unit cell group in which a plurality of unit cells are arranged and connected, but in assembling the battery module, a wiring module that includes bus bars and a group of wires is used.

As a specific example of the wiring module, a wiring module disclosed in JP 2016-9646A (hereinafter, referred to as Patent Document 1) is known. The wiring module includes an insulating protector that is attached to the upper surface of the unit cell group, and has a structure in which two bus bar housing portions, in each of which a plurality of bus bars are aligned and housed, are provided so as to extend along two lateral side edge portions of the insulating protector, respectively, and also two wire routing grooves, in each of which detection wires drawn from the unit cells are routed, are each provided inward of each bus bar housing portion.

When the wiring module described above is attached to the unit cell group, the bus bar housing portions and the wire routing grooves are covered by a cover. However, in view of the circumstances in which the wire routing grooves need to be covered by a cover in advance so as to prevent the detection wires from protruding out of the wire routing grooves during transportation to an attachment site, it is desirable that the bus bar housing portions and the wire routing grooves are configured to be independently openable and closable with separate covers.

For this reason, the wiring module disclosed in the patent document mentioned above is configured such that bus bar covers for covering the bus bar housing portions are provided integrally with two lateral side edge portions of the insulating protector, respectively, so as to be openable and closable via hinges, and wire covers for covering the wire house grooves are provided as separate members that are separate from the bus bar covers.

CITATION LIST

Patent Document

Patent Document 1: JP 2016-9646A

SUMMARY OF INVENTION

Technical Problem

However, with the conventional configuration described above, because the bus bar covers are provided as separate members, the number of components increases, which makes the structure complex, and it also takes time to close the covers. Accordingly, there has been strong demand for further improvement.

The technique disclosed in the specification of the present application has been accomplished under the circumstances described above.

Solution to Problem

The technique disclosed in the specification of the present application provides a wiring module that is to be attached to a power storage element group in which a plurality of power storage elements, each including a positive electrode terminal and a negative electrode terminal, are arranged, the wiring module including: an insulating protector that is to be attached to one side of the power storage element group, wherein the insulating protector includes: two bus bar housing portions, in each of which a plurality of bus bars for connecting adjacent electrode terminals are aligned and housed, and that are respectively provided at positions near two lateral side edge portions of the insulating protector extending in a direction in which the bus bars are aligned; and two wire routing grooves that are each provided on an inner side of each of the bus bar housing portions, and in each of which detection wires drawn from the power storage elements are routed so as to detect a state of the power storage elements, and a bus bar cover for covering the closer one of the bus bar housing portions and a wire cover for covering the wire routing groove on the inner side of the closer bus bar housing portion are provided on each of the lateral side edge portions of the insulating protector so as to be openable and closable independent of each other through pivoting about a bus bar cover hinge and a wire cover hinge that are provided separately.

Each bus bar housing portion is independently opened and closed by using the bus bar cover, and each wire routing groove is independently opened and closed by using the wire cover. Because the bus bar cover and the wire cover are both provided integrally with the insulating protector so as to be capable of pivoting via the hinges, it is possible to reduce the number of components and simplify the structure as compared with a configuration in which either of the bus bar cover and the wire cover is provided as a separate member. Also, the operation of closing the covers is simple, which leads to efficient assembly of the battery module.

Also, the wiring module may be configured as follows.

The wire cover may have a gate-like shape in which a pair of leg pieces are formed so as to extend from both ends of a strip-shaped main body portion that covers the wire routing groove toward the lateral side edge portion of the insulating protector, and the wire cover hinge may be attached to an extension end of each of the leg pieces. Also, the bus bar cover may have a flat plate shape that is fitted into the wire cover, and the bus bar cover hinge may be attached to a lateral side edge of the bus bar cover.

The bus bar cover is fitted into the gate-like shaped wire cover, thereby forming substantially one flat plate shape. Accordingly, the structure can be simplified and made more compact, which may contribute to space saving.

The bus bar cover may be divided into a plurality of parts in the direction in which the bus bars are aligned, and the bus bar cover hinge may be attached to each sub-bus bar cover formed by dividing the bus bar cover. Also, in the wire cover, a reinforcing leg extending from the main body portion may be formed so as to interpose the sub-bus bar covers of the bus bar cover, and the wire cover hinge may also be attached to an extension end of the reinforcing leg.

By dividing the bus bar cover and providing the reinforcing leg in the wire cover, both covers can be reinforced.

Advantageous Effects of Invention

According to the technique disclosed in the specification of the present application, it is possible to provide a wiring module in which the bus bar housing portions and the wire

DESCRIPTION OF EMBODIMENTS

Embodiment

An embodiment will be described with reference to FIGS. 1 to 12. A battery module M according to the present embodiment is mounted on a vehicle (not shown) such as an electric vehicle or a hybrid vehicle, and used as a power supply for driving the vehicle.

Figure 2:
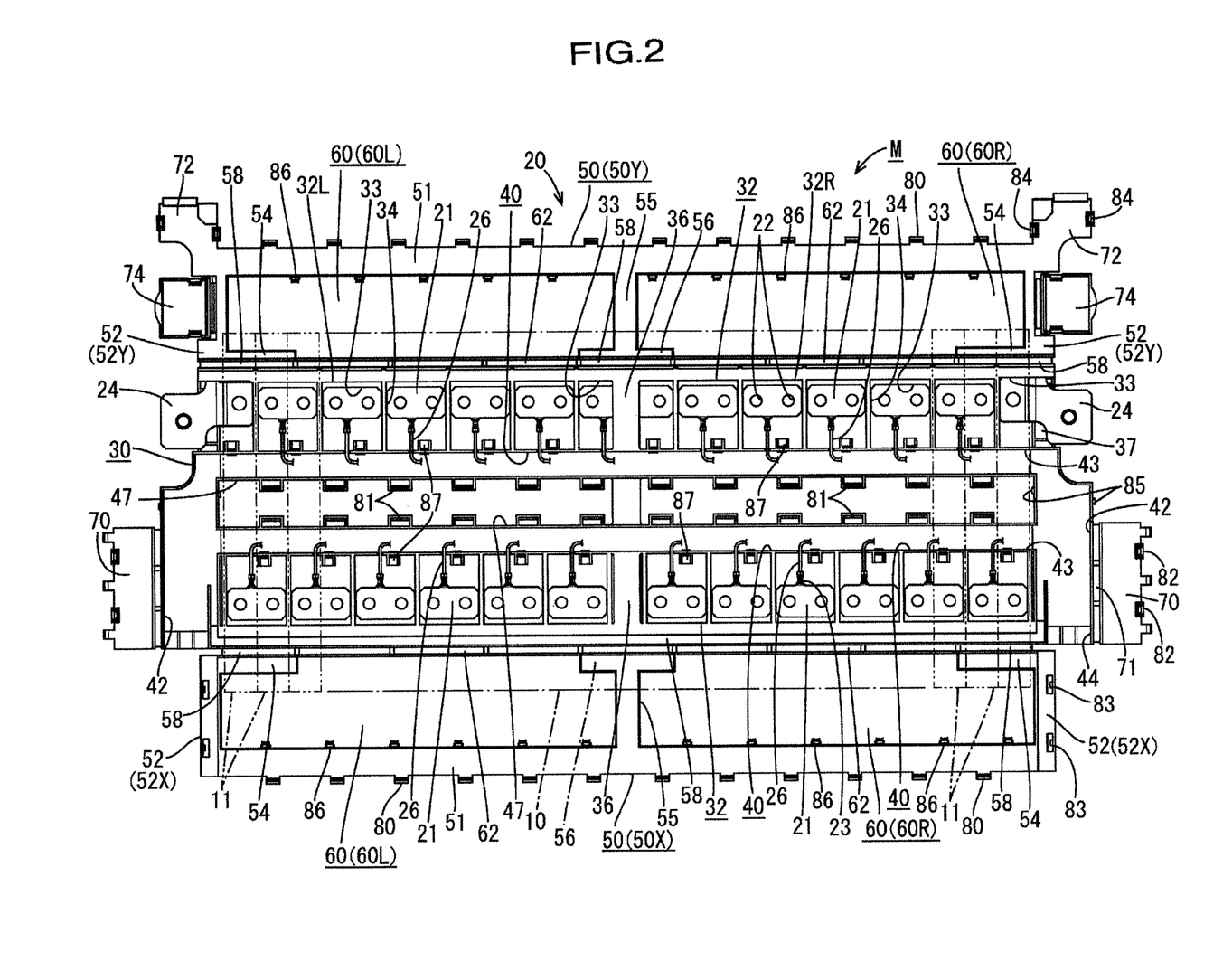
FIG. 2 is a plan view of the wiring module with covers open.

As shown in FIG. 2, the battery module M includes a unit cell group 10 (an example of a power storage element group) in which a plurality of unit cells 11 (an example of power storage elements) are arranged, and a wiring module 20 is attached to the upper surface of the unit cell group 10.

In the description given below, the lateral direction in FIG. 2 will be referred to as the "right-left direction", and the vertical direction in FIG. 2 will be referred to as the "front-rear direction".

Each unit cell 11 has a flat and substantially rectangular parallelepiped shape, and a positive electrode terminal and a negative electrode terminal pair (not shown) are formed in a protruding manner on the upper surface of the unit cell 11. There are two rows of electrodes in the lengthwise direction of the unit cell group 10. The unit cells 11 are provided such that electrode terminals of different polarities are adjacent to each other, thereby forming the unit cell group 10.

Figure 1:
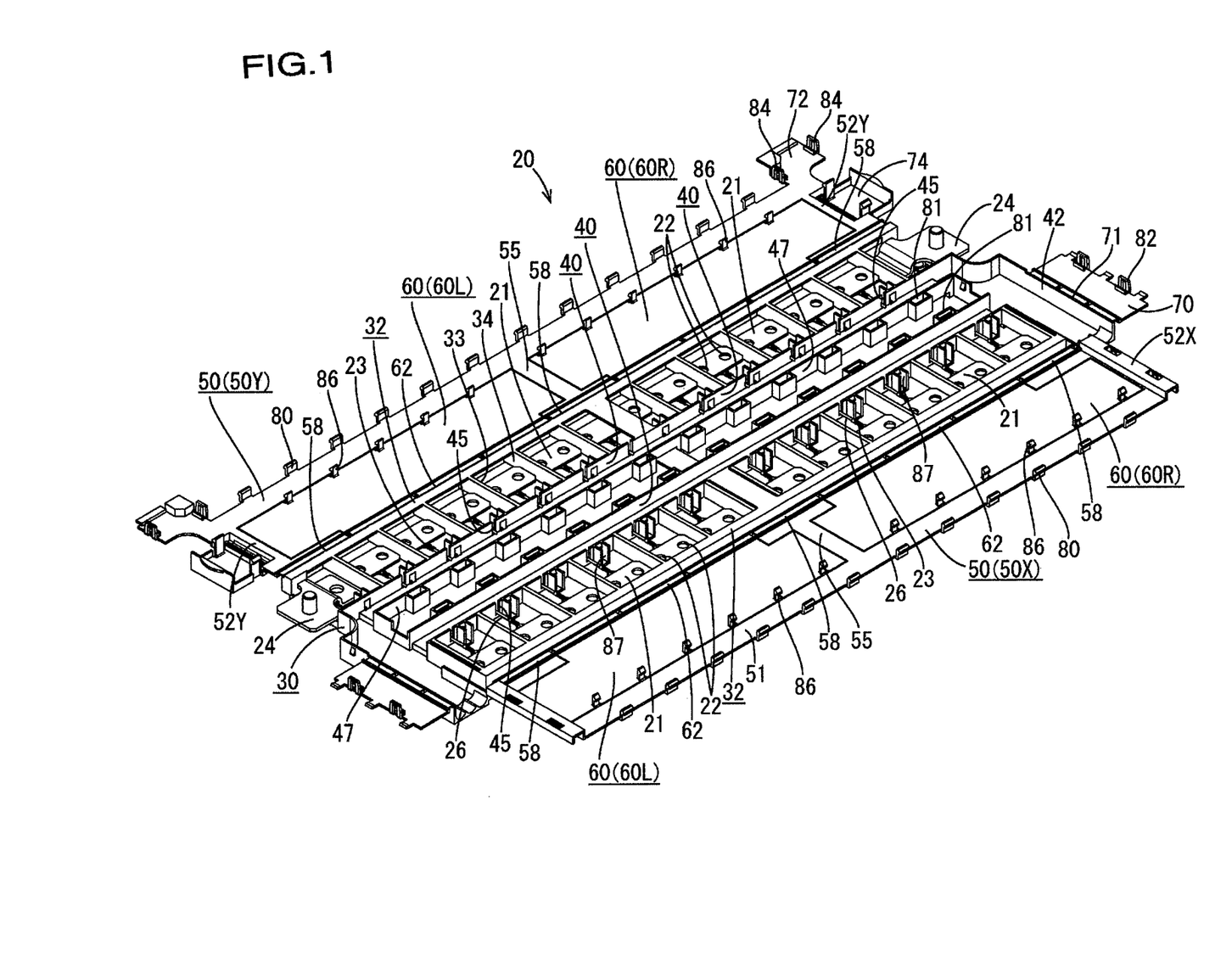
FIG. 1 is a perspective view of a wiring module according to an embodiment with covers open.

The wiring module 20 is attached to the upper surface (electrode surface) of the unit cell group 10. As shown in FIGS. 1 and 2, the wiring module 20 includes a plurality of bus bars 21 that connect the electrode terminals of adjacent unit cells 11, voltage detection wires 26 that are electrically connected to the bus bars 21 and detect the voltage of the unit cells 11, bus bar housing portions 32 that house the bus bars 21, and an insulating protector 30 that includes wire routing grooves 40 in which the detection wires 26 are housed and routed in one direction.

Each bus bar 21 has a substantially rectangular shape, and is formed by pressing, for example, an aluminum or aluminum alloy plate. A pair of through holes 22 for electrically connecting the electrode terminals of unit cells 11 are formed in each bus bar 21.

Each detection wire 26 is a coated wire. One end of the detection wire 26 is connected to a wire connection portion 23 that is provided on one of the long side edges of a bus bar 21, and the other end of the detection wire 26 is drawn out lateral to the bus bar 21.

Figure 3:
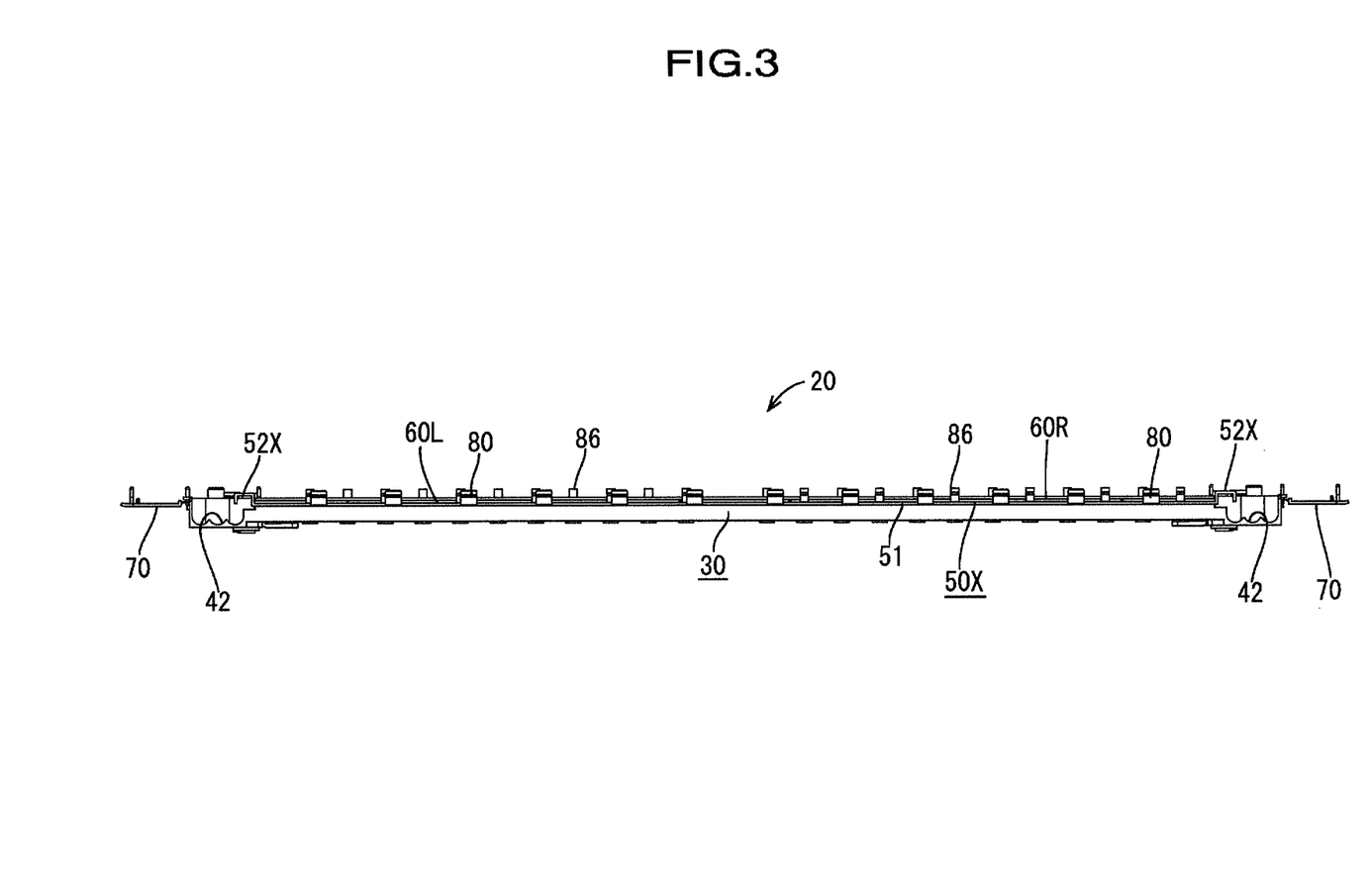
FIG. 3 is a front view of the wiring module with covers open.
Figure 4:
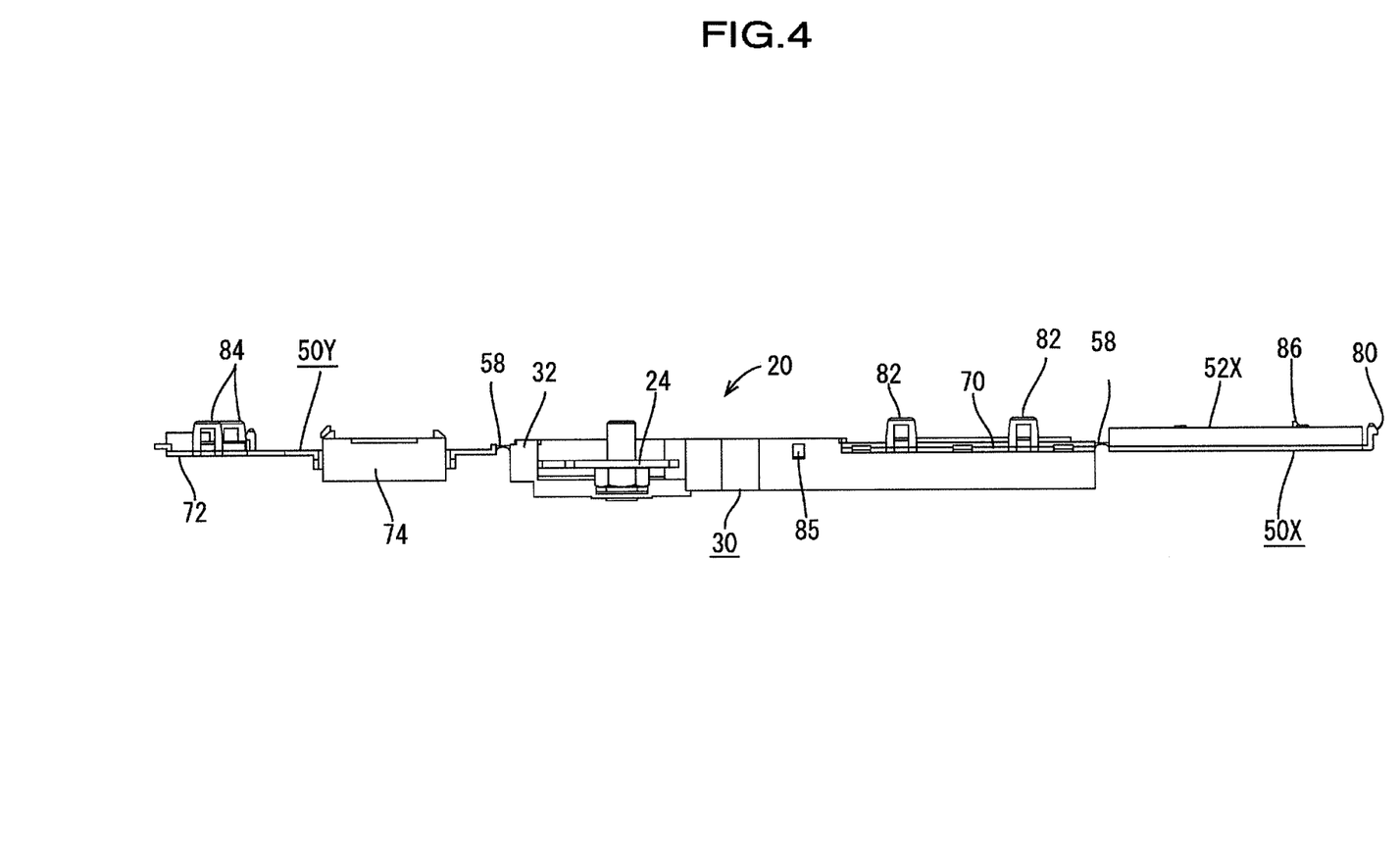
FIG. 4 is an enlarged side view of the wiring module with covers open.

The insulating protector 30 is made of a synthetic resin. As shown in FIGS. 2 and 3, the insulating protector 30 overall has a flat and rectangular parallelepiped shape elongated in the right-left direction with a length dimension substantially equal to the length of the unit cell group 10 and a width dimension slightly shorter than the width of the unit cell group 10.

Two bus bar housing portions 32, in each of which a plurality of bus bars 21 are aligned and housed, are provided in parallel to each other at positions near the front edge and the rear edge of the insulating protector 30.

Specifically, each bus bar housing portion 32 has a structure in which a plurality of square box shaped housing compartments 33 are aligned, each housing compartment 33 being formed by partition walls 34 and having an opening in its upper surface. A bus bar 21 is housed in a region on the outward side within each housing compartment 33. The bus bar 21 is elastically pressed and held against the bottom of the housing compartment 33 by a pressing member (not shown), and the underside of the bus bar 21 is exposed on the lower surface side through an opening (not shown) formed in the bottom.

The front and rear bus bar housing portions 32 are each divided into two right and left parts via a partition portion 36 at the center in the lengthwise direction. The front bus bar housing portion 32 and the rear bus bar housing portion 32 are provided such that the housing compartments 33 are offset by a half pitch, and thus the rear bus bar housing portion 32 has a structure in which the housing compartment 33 located at the lengthwise center is divided, and a housing compartment 33Y located at each end is substantially cut in half.

Outside of the housing compartment 33Y located at each end of the rear bus bar housing portion 32, an attachment portion 37 of an external connection bus bar 24 that connects the electrode terminal of the unit cell 11 to an external device (not shown) is provided.

On the inner side of the front and rear bus bar housing portions 32, two wire routing grooves 40 for routing the detection wires 26 drawn from the bus bars 21 in one direction so as to detect the voltages of the unit cells 11 are formed in parallel.

In each of the right and left end edges of the insulating protector 30, a wire guide groove 42 is formed so as to perpendicularly extend from the rear wire routing groove 40 to a region where the front bus bar housing portion 32 is formed. Also, inlets 43 that are respectively in communication with the right/left end portions of the front and rear wire routing grooves 40 are formed in the inner side wall of the wire guide groove 42, and an outlet 44 is formed in the front end of the wire guide groove 42. In the present embodiment, a right-side wire guide groove 42 is used.

As shown in FIG. 2, from each bus bar 21 housed in the front and rear bus bar housing portions 32, the other end of the detection wire 26 is drawn toward the inner side and inserted, through an insertion groove 45 (see FIG. 1) formed in a side wall, into the front or rear wire routing groove 40, and then routed in the wire routing groove 40 toward the right in FIG. 2. The detection wires 26 routed in the wire routing grooves 40 pass through the inlets 43 and are bent at right angles and routed together to the right-side wire guide groove 42, and then led out toward the front side through the outlet 44. A connector is connected to the other end of each detection wire 26 that has been led out so as to be connected to an ECU (not shown) or the like.

At a position between the front and rear wire routing grooves 40, a locking groove portion 47 that has a groove shape elongated in the right-left direction is formed.

The cover structure in the insulating protector 30 will be described next.

In the insulating protector 30, a set of a wire cover 50 for covering the wire routing groove 40 and a bus bar cover 60 for covering the bus bar housing portions 32 are provided on each of the front side and the rear side.

The wire cover 50 has a short gate-like shape in which a pair of leg pieces 52 are formed so as to extend from the right and left ends of a strip-shaped main body portion 51 that covers the wire routing groove 40 toward the front edge or the rear edge of the insulating protector 30. Connector portions 54 are respectively provided at the extension ends of the right and left leg pieces 52 so as to oppose each other and form an L shape with the leg piece. In addition, a reinforcing leg 55 is formed so as to extend from the lengthwise center position of the main body portion 51, and a connector portion 56 is formed at the extension end of the reinforcing leg 55 so as extend laterally and form a T shape.

As shown in FIG. 1, the connector portions 54 of both leg pieces 52 and the connector portion 56 of the reinforcing leg 55 of each of the front and rear wire covers 50 are connected to the front edge or the rear edge of the insulating protector 30 so as to be capable of pivoting via a first hinge 58 (corresponding to a wire cover hinge). As shown in FIG. 1, in a formed state, each of the front and rear wire covers 50 is in an open position in which it is parallel to the upper surface of the insulating protector 30 and open outward, and is brought into a closed position in which the main body portion 51 closes the wire routing groove 40 (see FIG. 5) by being pivoted 180 degrees about the first hinges 58 so as to overlap the upper surface of the insulating protector 30.

Figure 6:
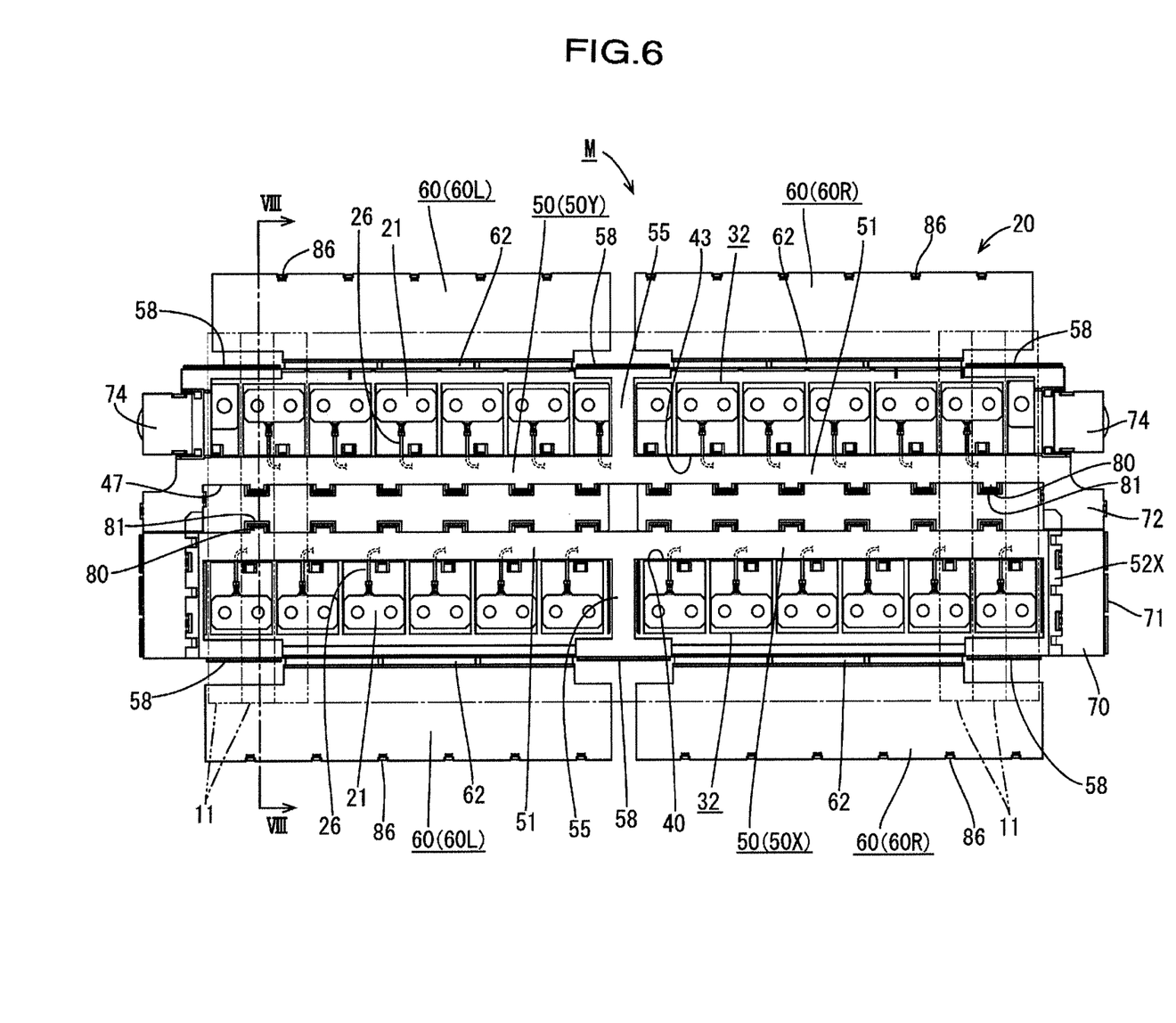
FIG. 6 is a plan view of the wiring module with wire covers closed.

The front wire cover 50X is configured such that, in the closed position, the right and left leg pieces 52X can be fitted inward of the inner wall in the front region of the wire guide groove 42 (see FIG. 6). Also, a first auxiliary wire cover 70 for covering the remaining portion of the front region of the wire guide groove 42 is provided on the outer wall of the wire guide groove 42 so as to be openable and closable by pivoting via an auxiliary hinge 71.

On the other hand, in the rear wire cover 50Y, a second auxiliary wire cover 72 for covering the rear region of the wire guide groove 42 and an auxiliary bus bar cover 74 for covering the external connection bus bar 24 are provided on each of the right and left leg pieces 52Y.

The locking structure for locking the wire covers 50 in the closed position will be described. On the outer edge of the main body portion 51 of each of the front and rear wire covers 50, a plurality of (twelve in the diagram) first locking pieces 80 are formed at a regular interval so as to protrude toward the near side in a direction that penetrates the sheet of FIG. 2. On the other hand, on the inner surface of each of the front wall and the rear wall of the locking groove portion 47, first lock receiving portions 81 that receive and engage with the first locking pieces 80 of the front or rear wire cover 50 are provided corresponding to the first locking pieces 80.

Also, two first auxiliary locking pieces 82 are provided on the outer edge of each first auxiliary wire cover 70, and first auxiliary lock receiving portions 83 that receive and engage with the first auxiliary locking pieces 82 are provided in each of the leg pieces 52X of the front wire cover 50X.

Second auxiliary locking pieces 84 are provided on the right and left end edges of the second auxiliary wire cover 72 of each leg piece 52Y of the rear wire cover 50Y, and second auxiliary lock receiving portions 85 that fit into and engage with the second auxiliary locking pieces 84 are provided on the outer surfaces of the inner and outer walls of the rear region of the wire guide groove 42.

Next, the bus bar covers 60 will be described. Each bus bar cover 60 is provided so as to be paired with the front or rear wire cover 50, and two (right and left) bus bar covers are provided in each of the front side and the rear side.

Right and left bus bar covers 60L and 60R each have a flat plate shape that is tightly fitted into the wire cover 50, and are configured so as to be capable of covering a left bus bar housing portion 32L and a right bus bar housing portion 32R, respectively.

Two (right and left) bus bar covers 60L and 60R on the front side and two (right and left) bus bar covers 60L and 60R on the rear side are respectively connected to the front edge and the rear edge of the insulating protector 30 at their inner edge portions so as to be capable of pivoting via second hinges 62 (corresponding to a bus bar cover hinge). In other words, the two (right and left) bus bar covers 60L and 60R are provided so as to be capable of pivoting independent of the wire cover 50 with which they are paired. The bus bar covers 60L and 60R are also configured to be capable of pivoting separately.

As shown in FIGS. 1 and 2, in the formed state, each set of the right and left bus bar covers 60L and 60R on the front side and the rear side are in an open position in which they are parallel to the upper surface of the insulating protector 30, while being fitted into and flush with the wire cover 50 with which they are paired, and are brought to a closed position in which they close the left bus bar housing portion 32L and the right bus bar housing portion 32R (see FIG. 9) by being pivoted 180 degrees about the second hinges 62 so as to overlap the upper surface of the insulating protector 30.

The locking structure for locking the bus bar covers 60 in the closed position is as follows. On the outer edge of each of the two (right and left) bus bar covers 60L and 60R on the front side and the rear side, a plurality of (six in the diagram) second locking pieces 86 are formed at a regular interval so as to protrude toward the near side in a direction that penetrates the sheet of FIG. 2. On the other hand, in the right and left bus bar housing portions 32L and 32R on the front side and the rear side, second lock receiving portions 87 that receive and engage with the second locking pieces 86 are provided corresponding to the second locking pieces 86 on the inner surface of the inner wall of each housing compartment 33.

Next, an example of a procedure for assembling a battery module M using the wiring module 20 of the present embodiment will be described.

First, a wiring module 20 is assembled. A predetermined number of bus bars 21 are prepared. Then, one end of a detection wire 26 is connected to the wire connection portion 23 of each bus bar 21, and the other end of the detection wire 26 is drawn out lateral to the bus bar 21.

Next, an insulating protector 30 in the formed state is prepared, and the bus bars 21 from which detection wires 26 are drawn as described above are housed and held in a predetermined number of housing compartments 33 of front and rear bus bar housing portions 32 as shown in FIG. 2. The detection wires 26 drawn from the bus bars 21 housed in the front bus bar housing portion 32 are guided to a front wire routing groove 40, and then routed toward the right side in the diagram within the front wire routing groove 40. Likewise, the detection wires 26 drawn from the bus bars 21 housed in the rear bus bar housing portion 32 are guided to a rear wire routing groove 40, and then routed toward the right side in the diagram within the rear wire routing groove 40. The bundles of the front and rear detection wires 26 are guided to the right-side wire guide groove 42, and together led out toward the front side.

Figure 5:
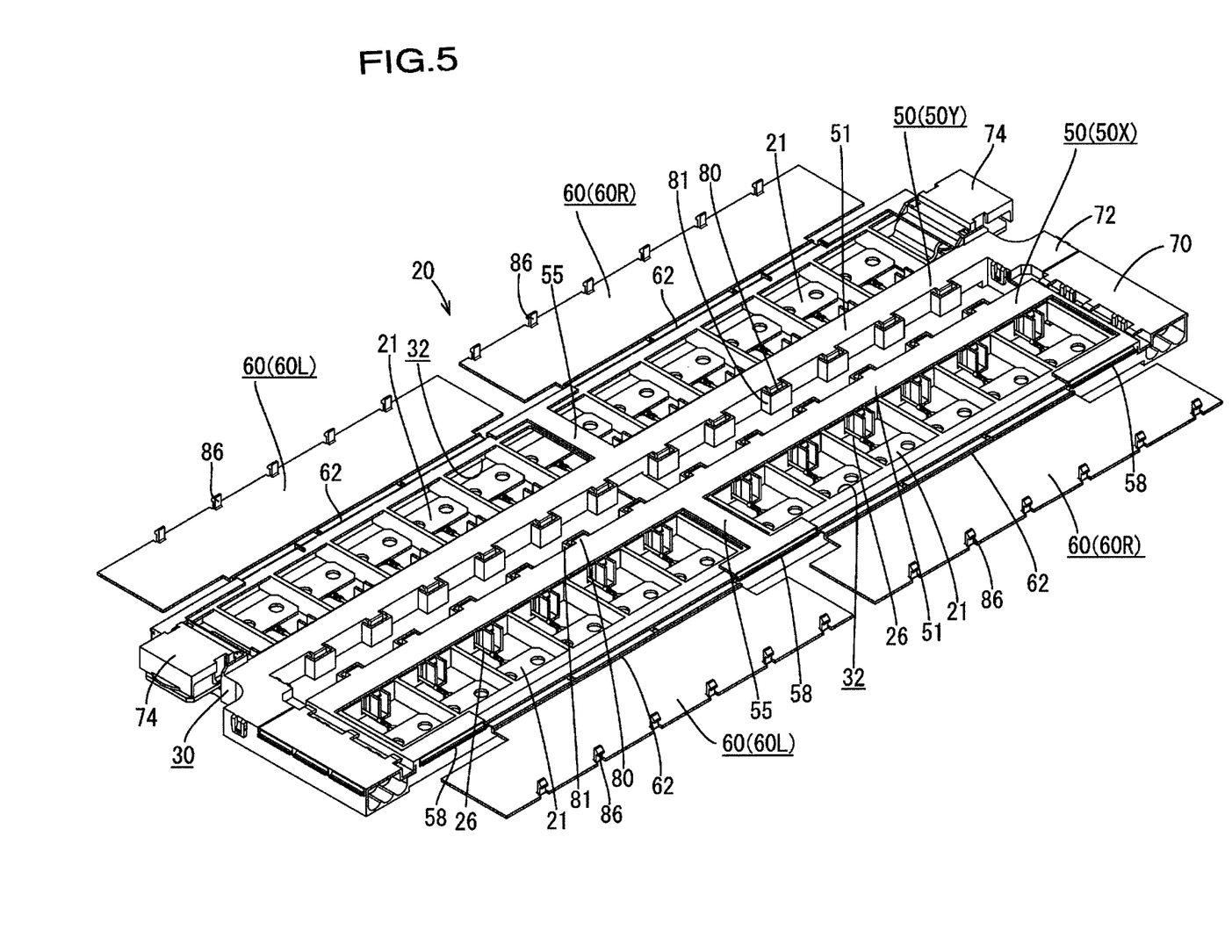
FIG. 5 is a perspective view of the wiring module with wire covers closed.
Figure 7:
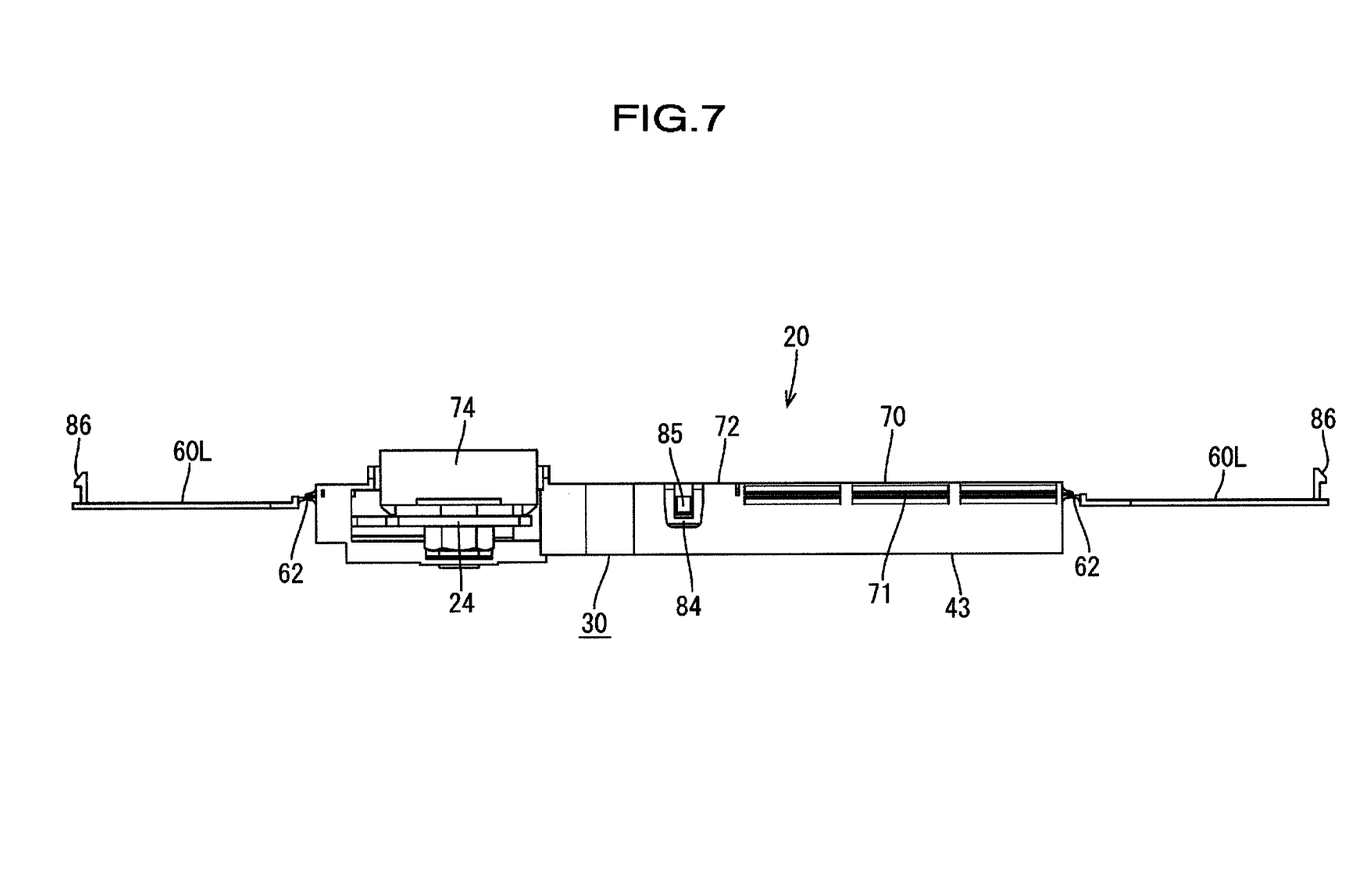
FIG. 7 is an enlarged side view of the wiring module with wire covers closed.
Figure 8:
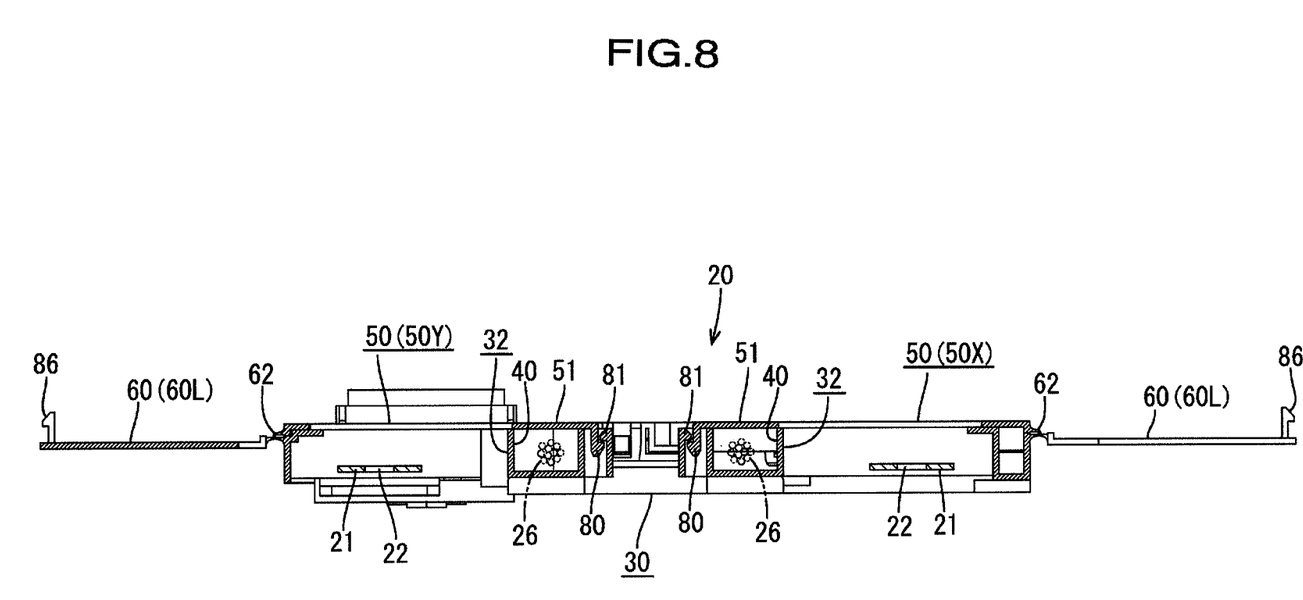
FIG. 8 is an enlarged cross sectional view taken along the line VIII-VIII shown in FIG. 6.

After the bus bars 21 have been housed and the detection wires 26 have been routed, the front and rear wire covers 50 are closed. The front and rear wire covers 50 in the open position are each pivoted 180 degrees about the first hinges 58, and brought to the closed position, as a result of which, as shown in FIGS. 5 to 7, the main body portions 51 cover the front and rear wire routing grooves 40, respectively. At this time, as shown in FIG. 8, the front and rear wire covers 50 are locked in the closed position as a result of the first locking pieces 80 of the wire covers 50 being received by and engaged with the corresponding first lock receiving portions 81 of the locking groove portion 47.

Also, along with the front wire cover 50X being locked in the closed position, the right and left leg pieces 52X are fitted inward of the inner walls in the front regions of the wire guide grooves 42. Then, by pivoting each first auxiliary wire cover 70 about the auxiliary hinge 71 so as to bring the first auxiliary wire cover 70 into the closed position, the first auxiliary locking pieces 82 are received by the first auxiliary lock receiving portions 83, as a result of which, as shown in FIGS. 5 and 6, the first auxiliary wire cover 70 is locked while covering the front region of the wire guide groove 42.

On the other hand, when the rear wire cover 50Y is locked in the closed position, the second auxiliary wire covers 72 provided on the right and left leg pieces 52Y cover the rear regions of the wire guide grooves 42, and the second auxiliary locking pieces 84 are received by the second auxiliary lock receiving portions 85, as a result of which the second auxiliary wire covers 72 are locked in the closed position. At the same time, the auxiliary bus bar covers 74 cover the external connection bus bars 24.

As described above, by closing the front and rear wire covers 50 and the first auxiliary wire covers 70, the front and rear wire routing grooves 40 in which the detection wires 26 are routed and the right-side wire guide groove 42 that is in communication with the wire routing grooves 40 are covered by the main body portions 51 of the wire covers 50, and the first auxiliary wire cover 70 and the second auxiliary wire cover 72 that are on the right side, as a result of which the routed detection wires 26 are prevented from protruding out of the wire routing grooves 40 and the wire guide groove 42.

After assembling the wiring module 20 in which the front and rear wire covers 50 and the first auxiliary wire covers 70 are closed as described above, the wiring module 20 in this state is transported to an attachment site for assembling a battery module M.

The transported wiring module 20 as shown in FIG. 6 is positioned and placed on the upper surface of a unit cell group 10, and the electrode terminals of the unit cells 11 and the corresponding bus bars 21 are sequentially fastened using fasteners (not shown) such as nuts, and the unit cells 11 are thereby connected in series.

Figure 9:
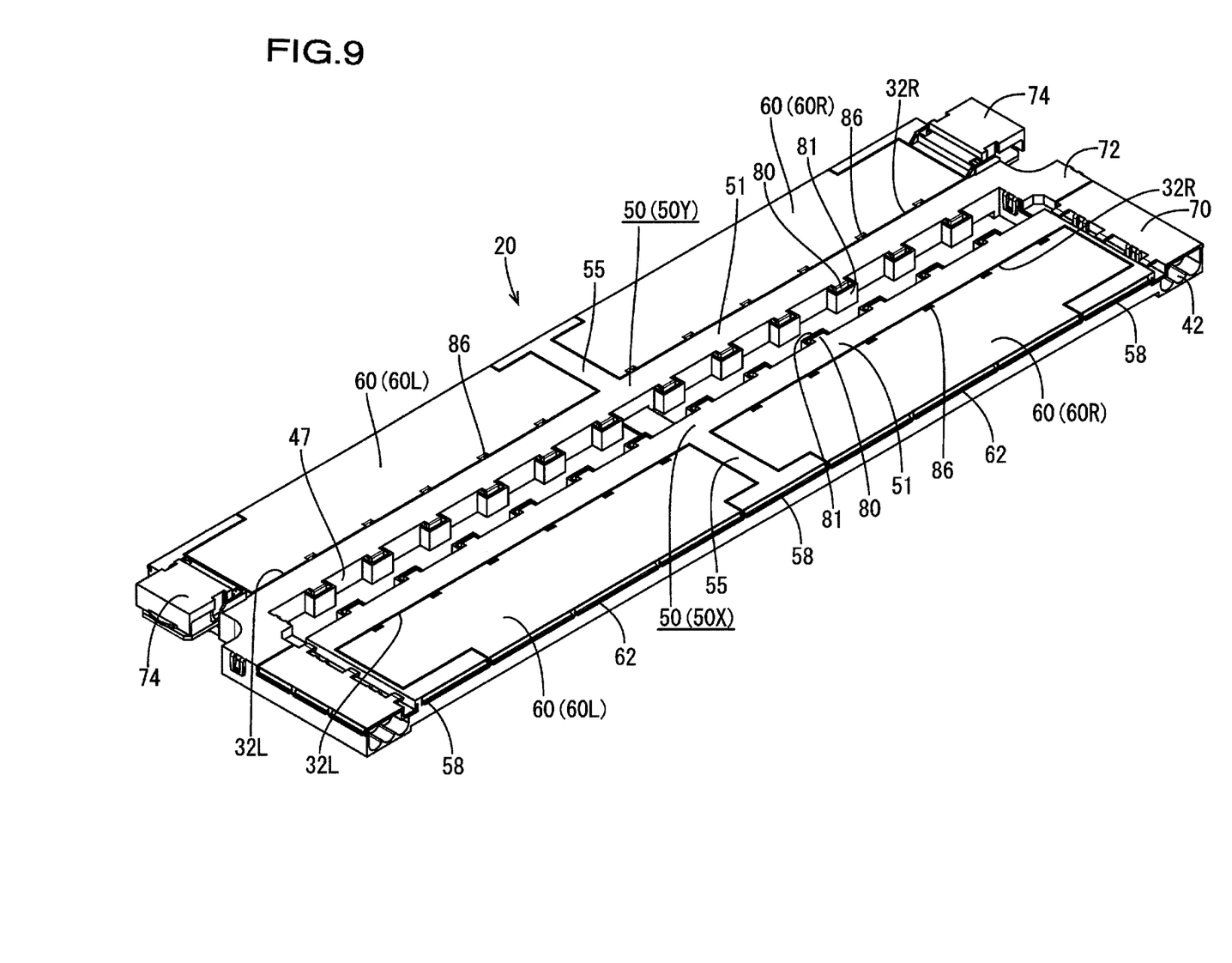
FIG. 9 is a perspective view of the wiring module with wire covers and bus bar covers closed.
Figure 10:
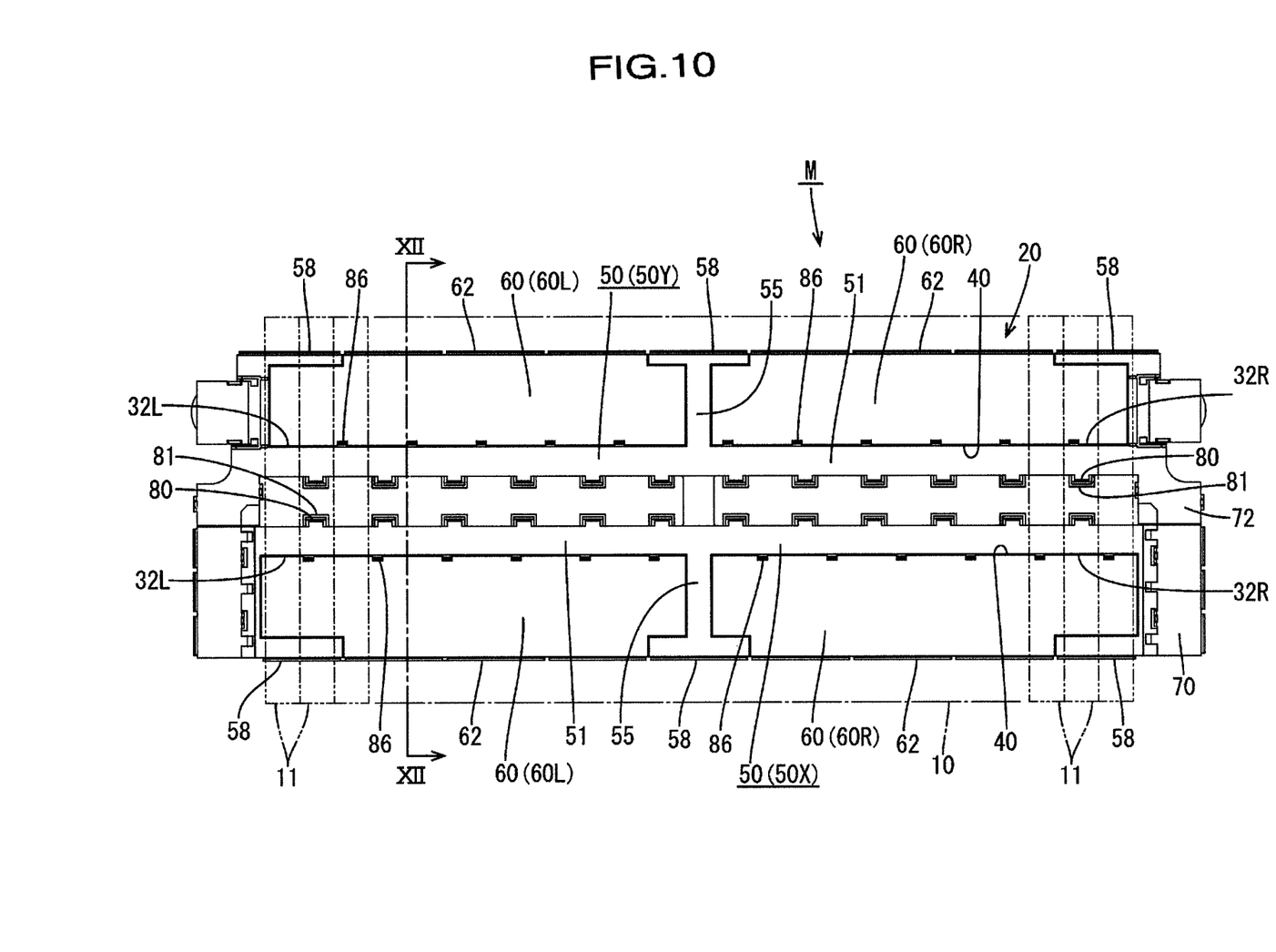
FIG. 10 is a plan view of the wiring module with wire covers and bus bar covers closed.
Figure 11:
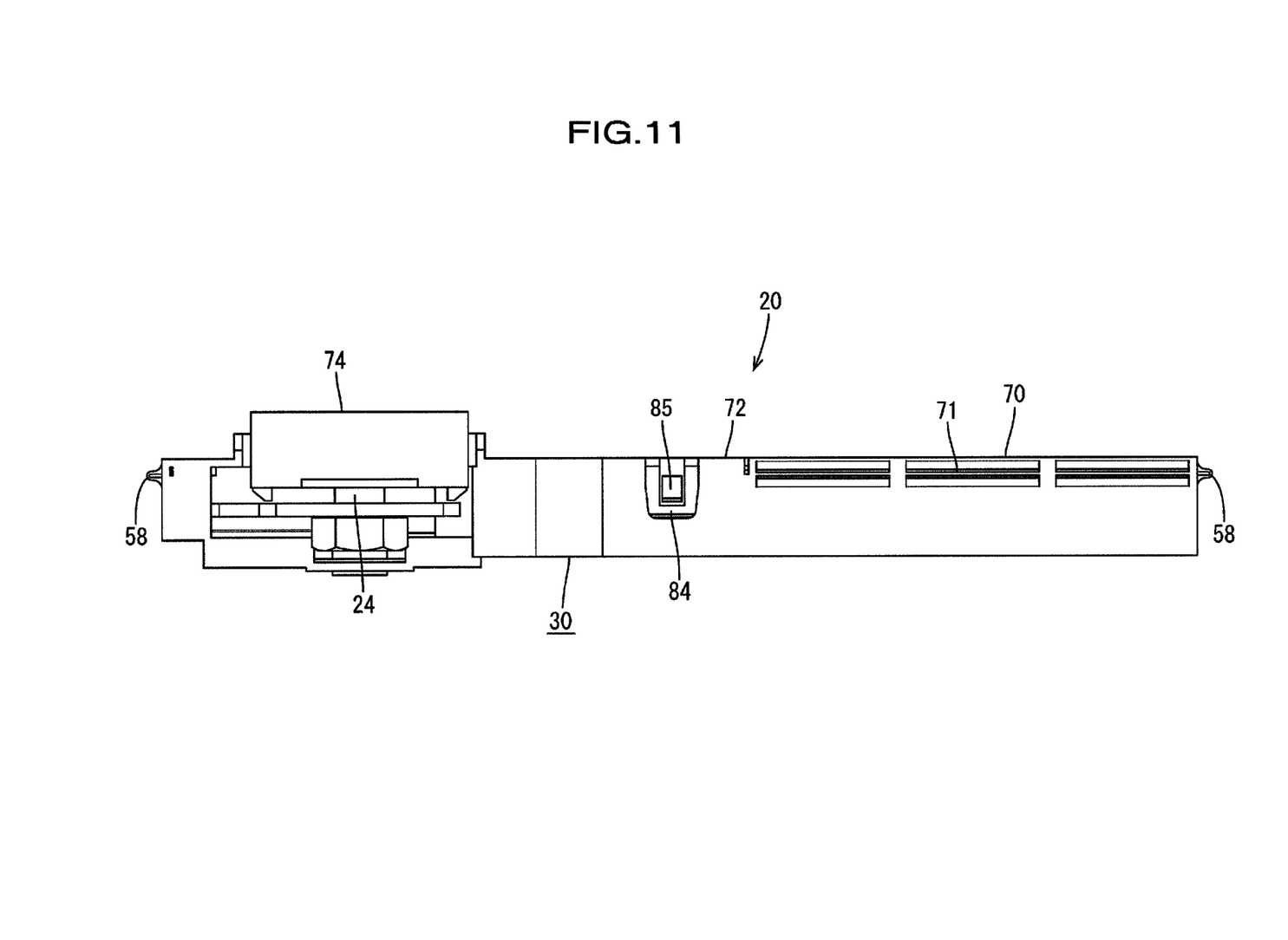
FIG. 11 is an enlarged side view of the wiring module with wire covers and bus bar covers closed.
Figure 12:
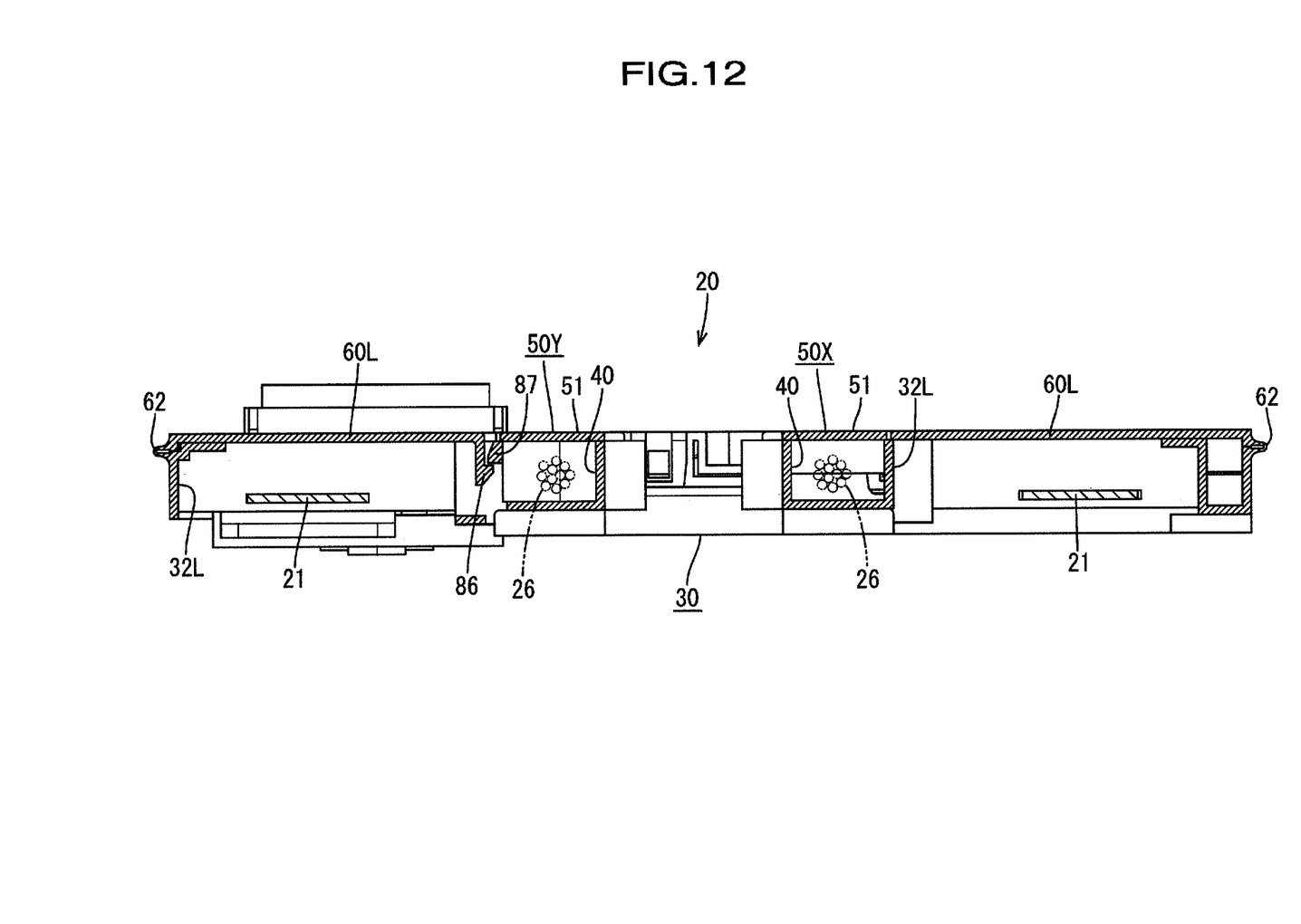
FIG. 12 is an enlarged cross sectional view taken along the line XII-XII shown in FIG. 10.

After the electric connection operation on the unit cell group 10 has been completed, the two (right and left) bus bar covers 60 on the front side and the rear side are closed. The bus bar covers 60L and 60R in the open position are pivoted 180 degrees about the second hinges 62, and brought to the closed position while being tightly fitted into the front or rear wire cover 50, and cover the corresponding bus bar housing portions 32L and 32R as shown in FIGS. 9 to 11. At this time, as shown in FIG. 12, each second locking piece 86 of the bus bar covers 60 is received by and engaged with the corresponding second lock receiving portion 87 of the housing compartment 33 that constitutes the bus bar housing portion 32, as a result of which the bus bar covers 60L and 60R are locked in a state in which they close the corresponding bus bar housing portions 32L and 32R.

Through the above processing, the bus bars 21 and the fasteners housed in the front and rear bus bar housing portions 32 are protected by a total of four bus bar covers 60. The assembly of the battery module M is thus complete.

In the wiring module 20 according to the present embodiment, the bus bar housing portions 32 are independently opened and closed by the bus bar covers 60, and the wire routing grooves 40 are independently opened and closed by the wire covers 50. Accordingly, the wire routing grooves 40 can be closed in advance by the wire covers 50 so as to prevent the detection wires 26 from protruding out of the wire routing grooves 40 during transportation to an attachment site where the wiring module 20 is to be attached to a unit cell group 10, which provides greater ease of use.

Each wire cover 50 and each bus bar cover 60 are both provided integrally with the insulating protector 30 so as to pivot via the hinges 58 and 62, and it is therefore possible to reduce the number of components and simplify the structure as compared with the configuration in which either of the wire cover 50 and the bus bar cover 60 is provided as a separate member. Also, the operation of closing the covers 50 and 60 is simple, which leads to efficient assembly of the battery module M.

The wire cover 50 has a gate-like shape in which a pair of leg pieces 52 are formed so as to extend from both ends of a strip-shaped main body portion 51 that covers the wire routing groove 40 toward a lateral side edge portion of the insulating protector 30, and also includes a first hinge 58 that is attached to each of the extension ends of the leg pieces 52, and the bus bar cover 60 has a flat plate shape that is fitted into the wire cover 50, and includes a second hinge 62 that is provided on a lateral side edge of the bus bar cover 60.

That is, the bus bar cover 60 is fitted into the gate-like shaped wire cover 50, thereby forming substantially one flat plate shape. Accordingly, the structure can be simplified and made more compact, which may contribute to space saving.

Furthermore, the bus bar cover 60 is divided into two parts in the lengthwise direction, and a second hinge 62 is attached to each of the bus bar covers 60L and 60R formed by dividing the bus bar cover 60. Also, in the wire cover 50, a reinforcing leg 55 extending from the main body portion 51 is formed so as to interpose the sub-bus bar covers of the bus bar cover 60, and the first hinge 58 is also attached to the extension end of the reinforcing leg 55.

By dividing the bus bar cover 60 into two parts, and providing the reinforcing leg 55 in the wire cover 50, both covers 50 and 60 can be reinforced. The configuration is effective when applied to a unit cell group 10 in which a large number of unit cells 11 are connected.

OTHER EMBODIMENTS

The technique disclosed in the specification of the present application is not limited to the embodiment described in the foregoing description with reference to the drawings. For example, the following embodiments are also encompassed within the technical scope.

(1) In the embodiment described above, an example has been shown in which the bus bar cover is divided into two parts. However, only one bus bar cover may be used, or the bus bar cover may be divided into three parts or more according to conditions such as the number of unit cells aligned.

(2) The locking structures for locking the wire covers and the bus bar covers in the closed state are not limited to those described in the embodiment above, and it is possible to use other structures.

(3) In the embodiment described above, as the structure for drawing detection wires, a structure in which the terminal end of each detection wire is directly connected to the wire connection portion that is formed integrally with a bus bar has been shown as an example. However, it is possible to use other configurations such as welding and fixing, to the bus bar, a detection terminal attached to the terminal end of each detection wire, or fixing the detection terminal through fastening using a fastener.

(4) In the embodiment described above, voltage detection wires are used as an example of the detection wires, but it is also possible to use other detection wires such as current detection wires or temperature detection wires.

(5) In the embodiment described above, unit cells are used as an example of the power storage elements, but it is also possible to use capacitors.

LIST OF REFERENCE NUMERALS

10 Unit cell group (power storage element group)
11 Unit cell (power storage element)
20 Wiring module
21 Bus bar
26 Detection wire
30 Insulating protector
32, 32L, 32R Bus bar housing portion
40 Wire routing groove
50, 50X, 50Y Wire cover
51 Main body portion
52 Leg piece
55 Reinforcing leg
58 First hinge (wire cover hinge)
60 Bus bar cover
60L, 60R Bus bar cover (sub-bus bar cover)
62 Second hinge (bus bar cover hinge)

What is claimed is:

1. A wiring module configured to be attached to a power storage element group in which a plurality of power storage elements, each including a positive electrode terminal and a negative electrode terminal, are arranged, the wiring module comprising:
an insulating protector configured to be attached to one side of the power storage element group,
wherein the insulating protector includes:
two bus bar housing portions, in each of which a plurality of bus bars for connecting adjacent electrode terminals are aligned and housed, and that are respectively provided at positions near two lateral side edge portions of the insulating protector extending in a direction in which the bus bars are aligned; and
two wire routing grooves that are each provided on an inner side of each of the bus bar housing portions, and in each of which detection wires drawn from the power storage elements are routed so as to detect a state of the power storage elements, and
a bus bar cover and a wire cover provided on each of the lateral side edge portions of the insulating protector, the bus bar cover configured to cover a closer one of the bus bar housing portions and the wire cover configured to cover one of the wire routing grooves on an inner side of the closer bus bar housing portion, the bus bar cover and the wire cover being openable and closable independent of each other through respectively pivoting about a bus bar cover hinge and a wire cover hinge that are provided separately, and the wire cover hinge is disposed outside of the closer bus bar housing portion in a direction perpendicular to direction in which the bus bars are aligned.

2. A wiring module configured to be attached to a power storage element group in which a plurality of power storage elements, each including a positive electrode terminal and a negative electrode terminal, are arranged, the wiring module comprising:
an insulating protector configured to be attached to one side of the power storage element group,
wherein the insulating protector includes:
two bus bar housing portions, in each of which a plurality of bus bars for connecting adjacent electrode terminals are aligned and housed, and that are respectively provided at positions near two lateral side edge portions of the insulating protector extending in a direction in which the bus bars are aligned; and
two wire routing grooves that are each provided on an inner side of each of the bus bar housing portions, and in each of which detection wires drawn from the power storage elements are routed so as to detect a state of the power storage elements, and
a bus bar cover and a wire cover provided on each of the lateral side edge portions of the insulating protector, the bus bar cover configured to cover a closer one of the bus bar housing portions and the wire cover configured to cover one of the wire routing grooves on an inner side of the closer bus bar housing portion, the bus bar cover and the wire cover being openable and closable independent of each other through respectively pivoting about a bus bar cover hinge and a wire cover hinge that are provided separately,
wherein the wire cover has a gate shape in which a pair of leg pieces extend from both ends of a strip-shaped main body portion that covers the one of the wire routing grooves toward a respective one of the lateral side edge portions of the insulating protector, and the wire cover hinge is attached to an extension end of each of the leg pieces, and
the bus bar cover has a flat plate shape that is fitted into the wire cover, and the bus bar cover hinge is attached to a lateral side edge of the bus bar cover.

3. The wiring module according to claim 2,
wherein the bus bar cover is divided into a plurality of parts in the direction in which the bus bars are aligned, and the bus bar cover hinge is attached to each bus bar cover part, and
the wire cover includes a reinforcing leg extending from the main body portion so as to interpose the bus bar cover parts, and the wire cover hinge is also attached to an extension end of the reinforcing leg.

* * * * *